United States Patent
Lee (10) Patent No.: US 6,181,945 B1
(45) Date of Patent: Jan. 30, 2001

(54) OPTIMIZATION OF PAGING COST IN MOBILE SWITCHING SYSTEM USING A GENETIC OPTIMIZATION METHOD

(75) Inventor: Hee C. Lee, Plano, TX (US)

(73) Assignee: Nortel Networks Limited, Montreal (CA)

( * ) Notice: Under 35 U.S.C. 154(b), the term of this patent shall be extended for 0 days.

(21) Appl. No.: 08/988,048

(22) Filed: Dec. 10, 1997

Related U.S. Application Data (60) Provisional application No. 60/034,844, filed on Jan. 27, 1997.

(51) Int. Cl.$^7$ ............................... H04Q 7/20; H04B 7/00
(52) U.S. Cl. .................. 455/458; 455/456; 455/38.1; 455/435
(58) Field of Search ..................... 455/458, 456, 455/38.1, 432, 435, 502

(56) References Cited

U.S. PATENT DOCUMENTS

| | | | |
|---|---|---|---|
| 5,390,234 | * 2/1995 | Bar-Noy et al. | 455/456 |
| 5,408,683 | * 4/1995 | Ablay et al. | 455/435 |
| 5,590,398 | * 12/1996 | Matthews | 455/456 |
| 5,594,776 | * 1/1997 | Dent | 455/458 |
| 5,826,173 | * 10/1998 | Dent | 455/458 |
| 5,842,127 | * 11/1998 | Pashtan et al. | 455/435 |
| 5,873,042 | * 2/1999 | Vo | 455/458 |
| 5,875,400 | * 2/1999 | Madhavapeddy et al. | 455/458 |
| 5,898,923 | * 4/1999 | Gaasvik et al. | 455/435 |
| 6,058,308 | * 5/2000 | Kallin et al. | 455/458 |

* cited by examiner

Primary Examiner—Edward F. Urban
Assistant Examiner—Rafael Perez-Gutierrez
(74) Attorney, Agent, or Firm—John D. Crane (57) ABSTRACT

The invention overcomes the inefficient conventional mobile paging methods that cause a bottleneck in the FOCC due to constraints of both the bandwidth and the limited number of radio frequency channels in mobile telecommunication systems. This is accomplished by first determining the mobility pattern of each mobile station during a given sampling period. Then the probability that the mobile station will be located within each cell in the network is determined. From the cells having non-zero probabilities, at least two paging zones are defined using a genetic optimization method which converges on paging zones which produce a minimum paging cost which correspondingly results in minimum utilization of the FOCC.

9 Claims, 2 Drawing Sheets

TABLE FOR TIME SEGMENT T2

| CELL NO | $C_1$ | $C_2$ | $C_3$ | $C_4$ | $C_5$ | $C_6$ | $C_7$ | $C_8$ | $C_9$ | $C_{10}$ | $C_{11} \circ\circ\circ C_{100}$ |
|---|---|---|---|---|---|---|---|---|---|---|---|
| COUNT | 246 | 0 | 830 | 521 | 39 | 657 | 26 | 516 | 769 | 0 | 0 $\circ\circ\circ$ 0 |

TABLE FOR TIME SEGMENT T3

| CELL NO | $C_1$ | $C_2$ | $C_3$ | $C_4$ | $C_5$ | $C_6$ | $C_7$ | $C_8$ | $C_9$ | $C_{10}$ | $C_{11} \circ\circ\circ C_{100}$ |
|---|---|---|---|---|---|---|---|---|---|---|---|
| COUNT | 4969 | 2450 | 0 | 0 | 387 | 8621 | 7621 | 4621 | 3620 | 2130 | 0 |

TABLE FOR TIME SEGMENT T4

| CELL NO | $C_1$ | $C_2$ | $C_3$ | $C_4$ | $C_5$ | $C_6$ | $C_7$ | $C_8$ | $C_9$ | $C_{10}$ | $C_{11} \circ\circ\circ C_{100}$ |
|---|---|---|---|---|---|---|---|---|---|---|---|
| COUNT | 1601 | 106 | 22 | 331 | 0 | 1372 | 21 | 401 | 723 | 0 | 0 |

| TABLE FOR TIME SEGMENT T2 | | | | | | | | | | |
|---|---|---|---|---|---|---|---|---|---|---|
| CELL NO | $C_1$ | $C_2$ | $C_3$ | $C_4$ | $C_5$ | $C_6$ | $C_7$ | $C_8$ | $C_9$ | $C_{10}$ | $C_{11} \circ \circ \circ C_{100}$ |
| COUNT | 246 | 0 | 830 | 521 | 39 | 657 | 26 | 516 | 769 | 0 | 0 ○○○ 0 |

| TABLE FOR TIME SEGMENT T3 | | | | | | | | | | |
|---|---|---|---|---|---|---|---|---|---|---|
| CELL NO | $C_1$ | $C_2$ | $C_3$ | $C_4$ | $C_5$ | $C_6$ | $C_7$ | $C_8$ | $C_9$ | $C_{10}$ | $C_{11} \circ \circ \circ C_{100}$ |
| COUNT | 4969 | 2450 | 0 | 0 | 387 | 8621 | 7621 | 4621 | 3620 | 2130 | 0 |

| TABLE FOR TIME SEGMENT T4 | | | | | | | | | | |
|---|---|---|---|---|---|---|---|---|---|---|
| CELL NO | $C_1$ | $C_2$ | $C_3$ | $C_4$ | $C_5$ | $C_6$ | $C_7$ | $C_8$ | $C_9$ | $C_{10}$ | $C_{11} \circ \circ \circ C_{100}$ |
| COUNT | 1601 | 106 | 22 | 331 | 0 | 1372 | 21 | 401 | 723 | 0 | 0 |

FIG. 4

OPTIMIZATION OF PAGING COST IN MOBILE SWITCHING SYSTEM USING A GENETIC OPTIMIZATION METHOD

This application claims priority under 35 USC § 119(e)(1) of provisional application No. 60/034,844 filed Jan. 27, 1997, entitled "Optimal Paging Zone by Genetic Algorithm."

BACKGROUND OF THE INVENTION

The invention relates generally to the field of cellular telecommunications networks and particularly to a method for optimizing paging cost in a cellular telecommunications network.

Typical cellular mobile networks use a radio frequency channel for wireless communication between a base station (stationary) and a mobile station (MS). The mobile radio frequency channel is a two-way communication channel. The channel consists of two frequencies with the channel bandwidth of 30 KHz. A number of radio channels are allocated to each cell site of a mobile switching system. These channels are logically divided into the voice channels and a single control channel. The voice channel carries the data and the voice between the mobile switching systems and the mobile stations. Each control channel carries the system control information such as paging message, mobile station registration, voice channel designation and hand off notification between the mobile switching system and the MS.

The control channel is divided into two different control channel formats: the forward control channel (FOCC) and the reverse control channel, based on the usage of the control channel. The FOCC is mainly used for delivering pages and system orders to the MS. The reverse control channel is used to transmit access requests from the MS to the mobile switching system coupled to a base station in the cell where the MS is located.

In many cellular networks, mobile switching center (MSC) does not have the exact information about the geographical location of all mobile stations operating in the network service area (SA). To locate a given MS, most of current mobile switching systems broadcast a page message through the FOCCs of all the cells in the SA. If the MS receives this page, it will acknowledge receipt thereof to the base station in the cell where the MS is currently located. The MSC is then notified as to the location of the MS.

A typical mobile switching system operating in large metropolitan areas consists of over 100 cells. In order to locate a mobile station, the mobile switching system has to broadcast the same paging message through all the FOCCs of over 100 cells in the system, but the mobile switch system receives only one reply message from the paged mobile station. Since the ratio of termination, response versus paging, is so low, the broadcasting of paging message to mobile stations causes a significant bottleneck problem in the FOCC resource. In order to alleviate the bottleneck generated by unnecessary paging messages sent through the FOCC, a number of location tracking strategies in a cellular mobile telephone network have been proposed.

Figure 1:
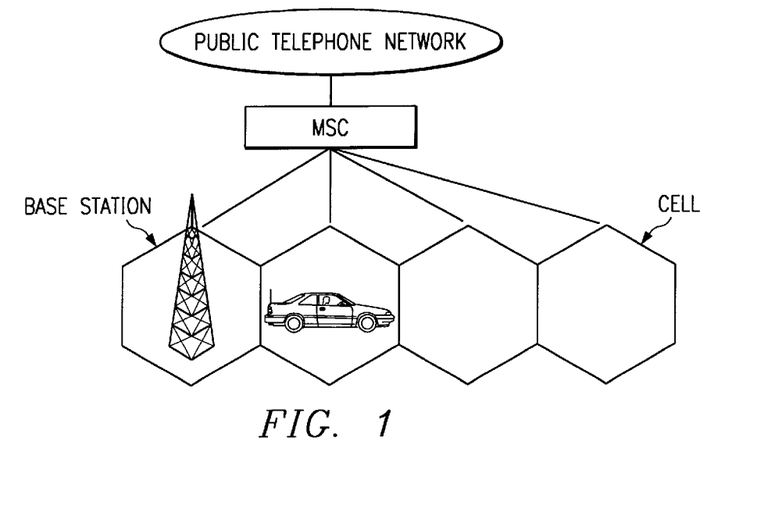
FIG. 1 is a pictorial illustration of a cellular telecommunications network.

There are three basic elements in a mobile switching system such as is illustrated in FIG. 1. The elements include a mobile station (MS), a base station, and a mobile switching center (MSC).

The mobile station (MS) could be a car phone, hand held, transportable, or any other type of wireless terminal. Each mobile station (MS) is identified by a mobile identification number (MIN). When the mobile station (MS) connects to the network, it transmits the MIN information, other data, and voice. It is also tunable on system command to a channel in the radio frequency spectrum allocated to the mobile switching system at certain power levels as pre-programmed.

Each of the base stations in the network are located at cell locations (the definition of a cell is given in the next paragraph) or sites throughout the mobile coverage area. Each base station receives and processes the radio frequency signals to make them suitable for the transmission between the wire line network and the radio network among all mobile stations interfacing with it.

The cell is a geographical area that the radio signal frequency, which is transmitted from a base station, covers to serve mobile telephone calls. In general, the size of a cell depends on the strength of the radio signal. The stronger the radio signal is, the wider area it can cover, and the larger the size of a cell is. The size of a cell can be adjusted by controlling the strength of radio signal that is transmitted from a base station.

The mobile switching center (MSC) operates as the central coordinator and controller for the mobile switching system. The MSC sends via a cell base station to the MS the different type of information such as the MSC's system identifier, the radio frequency that the MS should use for voice communication, page response acknowledgment, etc. The MSC also functions to provide the interface between the mobile station(s) and the public telephone network (PTN). In addition, the MSC performs the following functions:

1) Administration of radio channel allocation.
2) Coordination of the grid of cell sites and moving mobile units.
3) Maintenance of the integrity of the MSC as a whole.

The mobile switching system is organized in the hierarchical manner. As shown in FIG. 1, the MSC is connected to the public telephone network (PTN). Each MSC typically controls about 100 base stations on an average, and each base station serves a number of mobile stations simultaneously.

In general, a mobile station (the origination) can originate a call from any one of cells to any telecommunications device (the termination) in any geographical location area. As soon as the MSC receives a request from the originating mobile station MS, it determines the location of the mobile station and allocates a voice channel available to the mobile user (originator). Once the voice channel is allocated to the originator, the MSC connects to the teminating device. Where the terminating device is another mobile station MS, the MSC pages the terminating (terminal) mobile, and the MSC connects the call if the paged mobile responds to the paging.

The forward control channel message format, which is used between the base station and the MS, varies depending on the switching system standard utilized thereby. For example, in North American there are several Mobile Switching System Standards including the Electronic Industry Association Interim Standards known as IS-54 and IS-136 In this section, the FOCC message format of IS-54 is illustrated.

Figure 2:
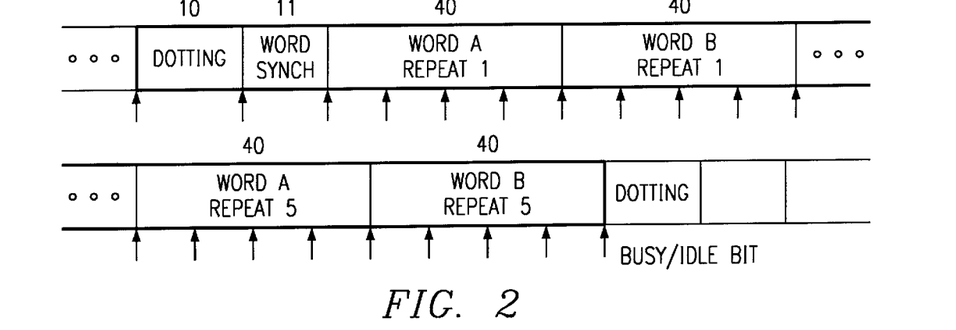
FIG. 2 is a block diagram of a forward control channel message frame.

The forward control channel (FOCC) is a continuous data stream sent at the rate of 10 kbps (kilobits per second) from the base station to all of the mobile stations to each MS coupled to the cell transmitting the FOCC. The message format of the FOCC is described as follows:

As shown in FIG. 2, the FOCC starts with two fields, the field of DOTTING with ten bits in length and the field of WORD SYNC with eleven bits. Both fields are sent to the mobile station (MS) to synchronize with the incoming data.

There are five repeating pairs following these two fields: the field of DOTTING and the field of WORD SYNC. Each pair contains two words, WORD A and WORD B, and each word with the size of 40 bits in length including a parity bit is sent out to each mobile station. The WORD A is for the MS whose least significant bit in the mobile identification number (MIN) is 0, and the WORD B is for the MS whose least significant bit in the MIN is 1. When an MS receives the FOCC message, it reads only one of these two words, either WORD A or WORD B, depending on its least significant bit of its MIN.

All the repeated pairs of both WORD A and WORD B contain the same. The reason for sending repeated pairs of both Word A and Word B is for the purpose of transmission error checking.

The format of WORD A and WORD B varies depending on the type of information that the FOCC message frame carries at any instant time. For example, if a FOCC message frame carries a paging message to locate a mobile station whose least significant bit of its MIN is 0, then the WORD A is formatted to contain a paging information for the mobile station.

A busy/idle bit stream, which indicates the status of the reverse control channel, is inserted in the message frame. The reverse control channel is busy if this bit is set to 0, otherwise it is 1 indicating that the reverse control channel is free. First, this bit occurs at the beginning of each sequence of both dotting and synch. Then, it also appears at the beginning of the first repeat of WORD A, and it is also inserted into each word at the distance of every 10 bits.

Each FOCC message frame consists of total 463 bits at the transmitting rate of 21.598 message frames per second. Accordingly, the number of paging messages that a FOCC can carry is limited by the bandwidth of the FOCC. However, the number of page messages that the system will attempt to initiate is call initiation dependent regardless which forward control channel format is used. In other words, as the number of call attempts increases in the system, the number of page messages in the system increases correspondingly thereby reducing the capacity of the FOCC to perform all its functions including paging.

Since the bandwidth bottleneck of a FOCC is due to heavy consumption and high occupation rate by paging, a number of mobile location tracking and paging methods have been studied in order to reduce the FOCC consumption in locating a paged mobile station.

An aggregate mobile station tracking strategy and reporting center approach was proposed by A. Bar-Noy, and I. Kessler, in "Tracking Users in Wireless Communications networks," IEEE Infocom Conference on Computer Communications, pp. 577–584, June 1994. This method designates a subset of all the cells in a service area as reporting centers. The strategy is described as follows: a mobile station sends the location update message whenever it enters a new reporting center and a tracking for the mobile station is restricted to the set of adjacent cells of the reporting center. This method is not efficient because for two major reasons. First, if a mobile station does not move far and it moves in and out of the reporting center frequently, the frequency channels will be heavily loaded due to unnecessary paging activities for location update. Second, even though a MS may move around frequently, it may never report changes of its current location for a long time if it never enters to a reporting center. Also, this strategy can not guarantee that the mobile station will responsed to the paging message sent to the adjacent cells of the last visited reporting center.

A location area approach was presented by S. Madhavapeddy and K. Basu in "Optimal Paging in Cellular Mobile Telephone Systems," Proceedings of the 14th International Teletraffic Congress, pp 493–502, June 1994. In this approach the mobile service area is partitioned into equal sized location areas. Each location area consists of a number of cells. All mobile stations register whenever they cross over from one location area to another. This strategy keeps track of the precise location area of every mobile station, and it also guarantees a mobile station can be exactly located whenever the MSC pages the most recent cells in the location area registered by the mobile station, but it is still inefficient for the following reasons. First, although the paging activities are reduced to only these cells in the most recently registered location area, all the registrations must be performed in the cells that are along the borders of the location areas where the mobile was most recently located. In addition, this approach makes the reverse control channels for these cells heavily loaded and congested. Second, all cells in the location area are still paged so that the call termination rate per cell paged is very low.

An individual mobile station tracking strategy utilizing the mobile station's mobility pattern was proposed S. Tabbane in "An Alternative Strategy for Location Tracking," IEEE Selected Areas in Communications, pp 880–892, June 1995. This strategy partitions the service area into several location areas based on each mobile station's mobility pattern. The location areas are arranged in descending order of location probabilities of mobile stations. When the MSC tries to locate a mobile station, the MSC pages the mobile station in these cells of location area with the highest probability first. If the mobile station is not found in the first paged location area, it will page the next highest one, and so on. The MSC will not stop paging until it receives a response message from the paged mobile station. However, this approach only considers the mobile probability pattern for the entire location area but not for each individual cell.

Another approach is described in a copending patent application entitled "Method for Reducing Paging Load In A Cellular Communication Stytem", Ser. No. 08/743,689, filed on Nov. 6, 1996, the content of which is incorporated herein by reference. The approach taken therein is primarily to determine a polling scheme based on the collective polling history of all the mobiles operating within the service area served by the network during a given monitoring period. As a result, this approach is not optimized on a subscriber by subscriber basis and results in a relatively high paging cost.

SUMMARY OF THE INVENTION

In view of the above mentioned problems with prior attempts to optimize paging in a cellular telecommunications network, it is the principal objective of the present invention to provide a paging method which produces has a lower paging cost than prior methods.

In achieving the above and other objectives, the method of the present invention first identifies the mobility pattern for each mobile station in the network during a sampling period and particularly the probability that a particular mobile is located in each cell of the network. Next, the probability that the mobile device is located within each physical cell in the network is utilized in a genetic optimization process to define a plurality of paging zones for locating the mobile device among only those cells where the probability that the mobile device is located therein is non-zero. Thereafter, the mobile device is paged in the paging zones defined earlier in the order of probability that the mobile device will be located within the cells of the paging zone.

DETAILED DESCRIPTION

For each mobile station, mobile device or mobile user (the terms mobile station, mobile device and mobile user are used interchangeably), multiple location area layers are defined as $\{L_1, L_2, \ldots, L_k\}$. The location area layers are based on the pattern of the mobile user's mobility during a typical day or any other sampling period selected. For example, the location area layer $L_1$ refers to the mobile user's working area, $L_2$ refers to the mobile user's home area. The location area layer $L_i$ can be used to partition the mobile service area into at least two location areas: $L_{i1}$ and $L_{i2}$ based on the mobile user's location probability in each cell $C_i$ and $1 \leq i \leq n$ where n is the number of cells in the network service area. The location area $L_{i1}$, contains all probable cells, $\{C_1, C_2, \ldots, C_m\}$, in the network service area that the mobile might reside in during the sampling period. The location area $L_{i2}$, contains the remaining cells in the network service area during the same sampling period.

We define the probability $Prob(C_i)$ for $1 \leq i \leq n$ as the corresponding probability of each cell in which the mobile station or mobile user may reside. Based on the probability $Prob(C_i)$ for $1 \leq i \leq n$, the location area $L_{i1}$ is partitioned into a set of paging zones $P_1, P_2, \ldots, P_k$ such that 1.) $\bigcup_{i=1}^{k} P_i = \{C_1, C_2, \ldots, C_m\}, P_i \subseteq \{C_1, C_2, C_3, \ldots, C_n\}$ and $1 \leq n \leq m$.

2.) $P_i \cap P_j = \emptyset$, $1 \leq i, j \leq k$, k is the total number of page zones to be generated.

3.) For each $C_i \in P_z$, $pos(C_i) < pos(C_j)$ for $1 \leq i \leq j \leq n \leq m$, $1 \leq z \leq k$, and $pos(C_i)$ is the position of $C_i$ in the $P_z$.

4.) For each page zone $P_z$, the probability $Prob(P_z) = \Sigma Prob(C_i)$, $\forall C_i \in P_z$, for $1 \leq i \leq j \leq n \leq m$ and $1 \leq z \leq k$.

As described in greater detail later, the probability Prob $(P_z)$ is employed to create the optimal partition, $PZ=\{P_1, P_2, P_3, \ldots, P_k\}$, such that $Prob(P_i) > Prob(P_j)$ for $1 \leq i < j \leq k$ and the $Prob(P_j)$ is the probability of each page zone in which the mobile station or mobile user may reside. The paging cost will be minimized if these paging zones are paged in such order $P_1, P_2, P_3, \ldots, P_k$ when the MSC tries to locate a mobile station.

The profile of a mobile station contains the information about the mobile user's multi-layered location areas and paging zones of location area $L_{i1}$.

The MSC uses this profile for the two following events:

1.) Location Area Registration

Whenever the MS moves from one location area to another location area, the MS sends the location area registration message to the closest base station nearby.

2.) Paging

When it tries to locate a mobile for establishing a call connection to the mobile station, the MSC obtains the mobile's current location area layer, the location area and the paging zones from the profile of the mobile. If the mobile's current location area is $L_{i1}$, then the MSC pages the cells in the paging zone $P_1$ first. If the mobile does not respond to the page message within a fixed short time period, the MSC pages the cells in the paging zone $P_2$, then $P_3$, so on. If the mobile does not respond to the page message until the last paging zone is paged, it is assumed that the mobile is not active. If the mobile's current location area is $L_{i2}$, the MSC pages all cells in the location area $L_{i2}$ at once since all the cells in the location area $L_{i2}$ have the same value of the mobile existence probability 0.

The mobility pattern of each mobile station or user is constantly monitored, and the location areas and paging zones are periodically updated and dynamically maintained.

Histogram for the Derivation of Mobile Probability Patterns

Since the approach of this invention depends on the knowledge of mobile probability patterns, it is crucial to derive the accurate mobile probability pattern for the partitioning of paging zones. The derivation process of the mobile probability patterns will be based on the paging/termination patterns of mobile stations in the different geographical location areas at different time segments. In practice, it has been found that the activities of paging/termination are not uniform in both the different time segments in a day and different cells. In the previous approaches, the non-uniformity of mobile usage patterns in the different geographical location areas and the different time segments has not considered.

A histogram is utilized for the purpose of discovering mobile probability patterns based on non-equally divided time segments and the cells in different geographical location areas. So the mobile probability patterns are derived from the data along two dimensions: the time segment's dimension and the geographical areas' dimension. The geographical areas' dimension consists of these cells arranged in the system-assigned sequential order.

This information in the mobile user's profile is used to derive the mobility pattern from the mobile user's data. For the simplicity, one dimension of array in the histogram is used to store the mobility data for mobile users from the different cells in different areas. The size of the array is equal to the number of cells in the system and the index of the array represents the cells in a system. The element of the array is the integer counter that is increased in one of the following situations:

The cell location of the mobile user is known to the system when

1) The mobile originates a call,
2) The mobile responds to a paging message;
3) The mobile registers (power on registration, power down registration, and location area registration).

Whenever any of these events has occurred, the corresponding cell's counter is incremented by one.

Figure 3:
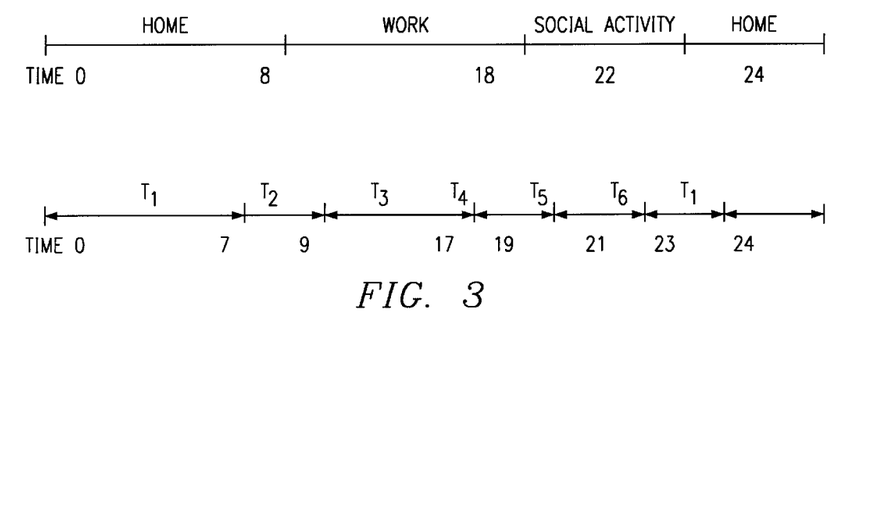
FIG. 3 is illustrates time lines of mobile users daily activity.

In order to achieve the accuracy of the mobility pattern data along the dimension of time segments, the data are also collected and segmented based on usage patterns in a day. Suppose, a mobile user's profile shows that: work 8:00 AM–6:00 PM, social activity 6:00 PM–10:00 PM, home 10:00 PM–8:00 AM. In this example, a day could be divided into three time segments. However, the time intervals covering the time periods when the user transitions between different activities can not be easily differentiated at an exact time point. For this reason, the time dimension considered below is segmented into six different time segments. In FIG. 3, the time segments $T_2$, $T_4$, and $T_6$ cover the boundaries of two different mobile user's activity patterns.

Figure 4:
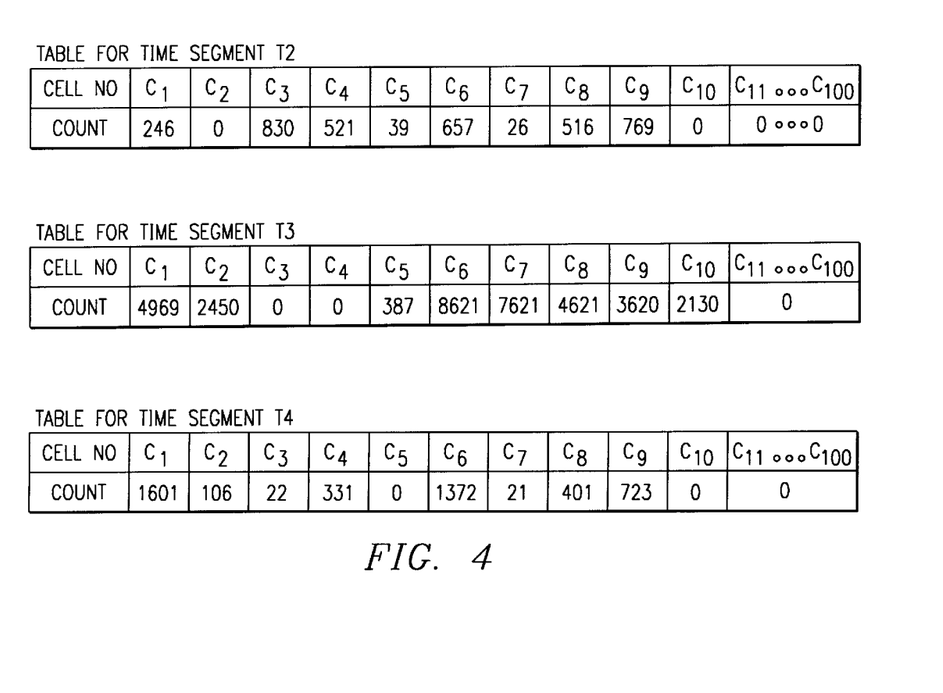
FIG. 4 comprises tables of mobile activities in various cells for selected time segments.

For the simplicity of implementation, use a set of one-dimensional arrays to collect and store the data for the purpose of deriving the mobile probability patterns. Each of elements in the one-dimensional array is sequentially corresponding to the mobile cells. Each array represents a set of collected data for each of time segments. The system collects the mobility data in the different data arrays depending on the different time segments for a long period. The tables of FIG. 4 give the values of mobile activities for different time segments. Later on, we will show the mobile probability will be derived from the histogram.

Creation of Location Area Layer and Location Area

The present approach defines location area layers from histogram tables of the mobility data. The location area layer $L_1$ is defined by combining the histogram data tables $T_6$, $T_1$ and $T_2$. In the same manner, the location area layer $L_2$ is constructed by combining the mobility data tables $T_2$, $T_3$, and $T_4$. The location area layer $L_3$ is constructed from the histogram data tables $T_4$, $T_5$, and $T_6$.

For each location area layer $L_i$, the method partitions the service area into two location areas, $L_{i1}$ and $L_{i2}$. From the combined mobility data collection tables of location area layer Li, the location area $L_{i1}$ is constructed by including all cells whose count value is non zero and the location area $L_{i2}$ is constructed by consisting all other cells in the service area. As soon as both the location area layer and the location area are defined, the mobile usage data from the histogram can be combined to generate the mobile probability values from different location area layers.

The mobile location probability of each cell Prob($C_i$) in the location area $L_{i1}$ is computed from the mobility data table which results in the following probabilities for the cells listed in the table.

paging zones $P_i$ for $1 \leq i \leq k$ such that $$m = N(P_1) + N(P_2) + N(P_3) + \ldots + N(P_k) = \sum_{i=1}^{k} N(P_i)$$

The mobile location probability of paging zone $P_i$ is Prob($P_i$), Prob($P_i$) is the probability such that the mobile station resides in the page zone $P_i$.

$$\text{Prob}(P_1) + \text{Prob}(P_2) + \ldots + \text{Prob}(P_k) = \sum_{i=1}^{k} \text{Prob}(P_i) = 1$$

Since there are extra consumption costs for both the forward control channel and fixed link channel each time a mobile station is paged, the symbol $\alpha$ is used to denote consumption in the forward control channel per paging message, and $\beta$ is used to denote consumption in the fixed link channel consumption in the MSC for each paging message. Both consumption costs in terms of $\alpha$ and $\beta$ are proportional to the size of frames in either the forward control channel or the fixed link channel in terms of bits. For the purpose of simplicity in experiments, we could choose the value 1 for both $\alpha$ and $\beta$ at this time since the actual values of both $\alpha$ and $\beta$ might vary from different industry standards.

The paging cost $C_p$ to locate a mobile user is defined as:

$$C_p = N(P_1) * \alpha * \beta + (1 - \text{Prob}(P_1)) * N(P_2) * \alpha * \beta +$$

$$\ldots + \left(1 - \sum_{i=1}^{k-1} \text{Prob}(P_i)\right) * N(P_j) * \alpha * \beta +$$

$$\ldots + \left(1 - \sum_{i=1}^{k-1} \text{Prob}(P_i)\right) * N(P_k) * \alpha * \beta$$

TABLE 1

Mobile Location Probability

| Cell No. | $C_1$ | $C_2$ | $C_3$ | $C_4$ | $C_5$ | $C_6$ | $C_7$ | $C_8$ | $C_9$ | $C_{10}$ | $C_{11} \ldots C_{100}$ |
|---|---|---|---|---|---|---|---|---|---|---|---|
| Probability | 0.16 | 0.06 | 0.02 | 0.02 | 0.01 | 0.25 | 0.18 | 0.13 | 0.12 | 0.05 | ... |

In following discussion, we will show that the location area $L_{i1}$ is farther partitioned into the several paging zones in order to obtain optimal paging cost.

Creation of Paging Zones in a Location Area

The primary objective of this invention is to partition the cells in a location area $L_{i1}$ into a set of paging zones such that the paging cost over the partitioned paging zones is minimized.

With the help of the combined histogram data table of the location area $L_{i1}$, the probability Prob($C_i$) for $1 \leq i \leq n$, is computed where n is the total number of cells having non-zero probabilities in the network.

Let $C_1$, $C_2$, ..., $C_m$ be m cells in the location area $L_{i1}$. The m cells are partitioned to a set of paging zones $\{P_i\}$ for $1 \leq i \leq k$. Let $N(P_i)$ be the number of cells in each of the -continued $$C_p = \left(N(P_1) + \sum_{j=2}^{k} \left(\left(1 - \sum_{i=1}^{j-1} \text{Prob}(P_i)\right) * N(P_j)\right)\right) * \alpha * \beta$$

The paging cost is incurred if and only if the page zone is paged. Based on assumptions and the definition of the mobile location probability, the paging process will stop as soon as the paged mobile responses to the paging message. Since the page process always starts at the page zone with the highest probability, the chance of earlier termination is always very high. If this is the case, not every page zone is necessarily paged. Thus, the paging cost can be reduced to the minimal level, so the consumption of FOCC is. In the next section, we will show how these paging zones are configured by applying the genetic algorithm.

Paging Zone Configuration by Applying the Genetic Optimization

The individual object (chromosome) consists of a set of character strings: 1, 2, 3 . . . , k where k is the number of paging zones. Each character string in a chromosome represents paging zone. Each chromosome has, associated therewith a paging cost. Genetic optimization using genetic operations such as reproduction, and cross over is used to transform a set of chromosome (population) into a new population.

The genetic optimization continuously produces new populations till it finds the best individual with the optimal paging cost. When the best individual is found, the character strings of the individual are used to partition the cells in the location area into a number of paging zones.

Genotype Representation $PZ=\{P_i|1 \leq i \leq k \leq m\}$ is the set of page zones to be generated by partitioning m cells based on the paging cost function where k is the total number of page zones and m is the total number of cells. In practice, k is a number greater than or equal to 2 and less than or equal to m. In most applications of the genetic optimization will work effectively when the number k is in the range of between 2 and 4 although higher values can be utilized as well.

cs is a chromosome string of integers $d_1 d_2 d_3 \ldots d_x \ldots d_n$ such as $\forall d_x d_x \in \{1, 2, 3, \ldots, k\}$ where $1 \leq x \leq n \leq m$, x is the cell position number in the chromosome string cs.

The position of each integer digit $d_x$ represents the corresponding cell position number in the sorted cell list of location area $L_{i1}$. For example, the 5th cell in the sorted cell list of location area $L_{i1}$ is represented by the 5th digit $d_5$ of the chromosome '112241133 . . . '. The fixed length of a chromosome string cs is equal to the total number of cells in the location area $L_{i1}$. The character '1' in the xth position of the chromosome represents the xth cell in the sorted cell list of the location area $L_{i1}$ is in the paging zone $P_1$. The character '2' in the yth position of the chromosome represents the yth cell in the sorted cell list of the location area $L_{i1}$ is in the paging zone $P_2$, and so on.

Suppose, there are 10 cells in the location area $L_{i1}$ and they are sorted as following: {10, 20, 30, 40, 50, 60, 70, 80, 90, 100}. Assume, the cells 10, 40, 70, and 100 are in the paging zone $P_1$, the cells 20, 30, and 90 are in the paging zone $P_2$, and the cells 50, 60, and 80 are in the paging zone $P_3$. Then the corresponding chromosome string is represented as '1221331321'.

Genotype to Phenotype Conversion

The mobile location probability of each cell $Prob(C_i)$ in the location area $L_{i1}$ is computed from the mobility data table, and the sample is given as in Table 1. In Table 1, the cell $C_1$ has the mobile location probability 0.16. When the mobile station is paged, the probability $Prob(C_i)$ that the mobile responds to the paging message from the cell 1 is 0.16.

The type conversion function, Genotype_to_Phenotype_Conversion, uses this probability table. The function takes a chromosome as input. The function counts the total number of same character 'i' in a chromosome string, i.e., $N(P_i)$, and adds the mobile location probability, i.e., $Prob(P_i)$ of each cell whose corresponding character is 'i'. The function repeats this process for all different integer digits in a chromosome string.

The Paging Cost and Convergence of the Genetic Algorithm

The paging cost function computes the paging cost that the MSC pages the mobile within the given paging zone (chromosome). The paging cost function is computed as follows:

$$C_p = N(P_1) * \alpha * \beta + (1 - Prob(P_1)) * N(P_2) * \alpha * \beta +$$

$$+ \left(1 - \sum_{i=1}^{j-1} Prob(P_i)\right) * N(P_j) * \alpha * \beta +$$

$$\ldots + \left(1 - \sum_{i=1}^{k-1} Prob(P_i)\right) * N(P_k) * \alpha * \beta$$

$$C_p = \left(N(P_1) + \sum_{j=2}^{k} \left(\left(1 - \sum_{i=1}^{j-1} Prob(P_i)\right) * N(P_j)\right)\right) * \alpha * \beta$$

Since the term $$\sum_{j=2}^{k} \left(\left(1 - \sum_{i=1}^{j-1} Prob(P_i)\right) * N(P_j)\right) * \alpha * \beta$$

is the dominant part of the paging cost function, it is always most favorable for the paging zone with the highest probability. The higher the value of $Prob(P_1)$ or $Prob(P_i)$ is, the less the value of the term $$\sum_{j=2}^{k} \left(\left(1 - \sum_{i=1}^{j-1} Prob(P_i)\right) * N(P_j)\right) * \alpha * \beta,$$

and the less the paging cost. Since the paging cost function is always most favorable for the paging zone with the highest probability which implies the lowest paging cost, the best candidate with the lowest paging cost is always selected during the evolution process based on the tournament selection. Our experiments also prove that the computation procedure converges within 9–12 generations.

Genetic Operators Used

Two genetic operators (crossover and reproduction) are used to create the new generation.

1.) Crossover Operator

Two children are generated from the given two parents, parent 1 and 2. Assume the length of a chromosome string is m. The division point x from 1 to m−1 is determined randomly by using a uniform probability distribution. The two parents chromosomes are divided at position x into two character string fragments. The fragment A refers to the left hand side of position x and the fragment B refers to the right hand side of position x. The fragment A from parent 1 is copied into child 1 beginning at position 0. The fragment B from parent 2 is copied into child 1 beginning at position x. Likewise, the fragment A from parent 2 is copied into child 2 beginning at position 0. The fragment B from parent 1 is copied into child 2 beginning at position x.

2.) Reproduction

A child is created by copying the chromosome string of the parent.

Summary of Genetic Optimization

The first step of optimizing the paging cost according to the present invention is to determine the probability that each mobile station is located in each cell in the cellular network during a given sampling period. The sampling period may be for an extended period of days, for time periods during an extended period of days, specific time periods during a given day or any other time frame selected by the network provider.

The second step is to randomly assign cells having non-zero probabilities to paging zones to produce a first generation of zone paging plans. The number of paging zones is arbitrarily selected in the range of from 2 to k where k is the number of cells having non-zero probabilities. In most typical applications, the number of paging zones is in the range of from 2 to about 4 because having more paging zone will increase the paging response time to an unacceptably large value. Each zone paging plan in the first generation consists of the selected number of paging zones, each zone having one or more uniquely identified cells having non-zero probabilities. The number of zone paging plans in the first generation is arbitrary, however, good results have been obtained where there are at least about 100 zone paging plans in the first generation.

The third step is to determine the paging cost of each zone paging plan as outlined above.

The fourth step is to select the two zone paging plans having the lowest paging cost. These two zone paging plans are then subjected to a genetic operation, either cross-over or reproduction, to produce a two "children" paging plans. The paging cost of these two "children" paging plans is also calculated. The exact ratio of the two genetic operations is not critical. However, it is believed that selecting cross-over 70% of the time and reproduction 30% of the time gives very good results. Other ratios will be operative although the overall effectiveness of the approach may be different from that observed with a 70/30 cross-over/reproduction ratio.

The fifth step is to identify the two zone paging plans having the highest paging cost in the first generation of paging plans. These two highest paging cost plans are then replaced by the two "children" paging plans.

The sixth step is to repeat steps four and five for an arbitrary number of times until a second generation has been produced. The number of times steps four and five are repeated is not critical although it is believed that more than about 25 times is desirable.

The seventh step is to repeat steps four, five and six until the paging cost of the zone paging plan having the lowest paging cost in the population is not reduced.

The eighth step is to select the zone paging plan from the final generation having the lowest paging cost. This zone paging plan should then be utilized for paging the particular mobile unit for which the plan was developed until a subsequent plan is developed following a later sampling of the mobility for the same mobile unit.

Control Strategy

The tournament selection mechanism is used for both parent selection and old generation replacement. The control strategy used in the paging zone configuration genetic optimization is the steady state control. The details of the steady state control are as follows:

The population size is fixed over the life of program run.

The individual is implemented by a single array of characters.

The parents are selected through the tournament selection method to create new individuals; tournament selection—select n individuals from the population using a uniform probability distribution and select a parent from the n individuals that has the smallest paging cost.

The individuals are selected through the inverse tournament selection method to be replaced by the new individual; inverse tournament selection—select n individual from the population using a uniform probability distribution and select a individual from n individuals that has the largest paging cost.

New individuals that are created from the parents by the genetic operators replace the existing individuals in the population.

The replaced individuals are dead and no longer used as a source of genetic materials in the population

EXAMPLE

The optimal paging strategy developed through the use of the present invention is illustrated below with an example involving two paging zones.

Step 1) Generating the Histogram

Assume the Mobile Switching System consists of 10 cells, and the data from T2, T3, and T4 time segments are stored for mobile activity counts as well as the mobile usage pattern. Assume the data stored in the arrays corresponding to T2, T3, and T4 are the mobile usage data from the time segment T2:7.00 AM–9:00 AM, T3: 9:00 AM–5:00 PM, and T4: 5:00 PM–7-M PM in a week.

| Cell No | $C_1$ | $C_2$ | $C_3$ | $C_4$ | $C_5$ | $C_6$ | $C_7$ | $C_8$ | $C_9$ | $C_{10}$ |
|---|---|---|---|---|---|---|---|---|---|---|
| T2 | 0 | 2 | 0 | 6 | 0 | 0 | 5 | 0 | 0 | 0 |
| T3 | 0 | 14 | 0 | 25 | 0 | 22 | 16 | 0 | 3 | 0 |
| T4 | 0 | 1 | 0 | 4 | 0 | 2 | 0 | 0 | 0 | 0 |

Step 2) Generating the Location Area Layer and the Location Areas

The data in tables T2, T3, and T4 are combined to a single table to create the mobile station location area layer for L2, for example, the 'working area.'

TABLE 2

The Combined Data Histogram Table

| Cell No | $C_1$ | $C_2$ | $C_3$ | $C_4$ | $C_5$ | $C_6$ | $C_7$ | $C_8$ | $C_9$ | $C_{10}$ |
|---|---|---|---|---|---|---|---|---|---|---|
| Count | 0 | 17 | 0 | 35 | 0 | 24 | 21 | 0 | 3 | 0 |

The location area layer L2 is further partitioned into location areas $L_{21}$ and $L_{22}$: $L_{21}=\{2, 4, 6, 7, 9\}$ consists of all non-zero count cells, and $L_{22}=\{1, 3, 5, 8, 10\}$ consists of all zero count cells, where the numbers within the parentheses are the corresponding cell numbers in the location layer. Although the histogram data shows there is no activity in the location layer $L_{22}$, the paging method still has to consider the possibility such that the mobile station may enter and stay in the location layer $L_{22}$ in order to be foolproof.

Step 3) Creating Initial Partition of Paging a.) Initial Paging Zone Assignment to Cells in the Location Layer The location area $L_{21}$ is further partitioned into two paging zones, $P_1$ and $P_2$. Since the genetic optimization partitions the location area $L_{21}$ into two paging zones, the chromosome string of the genotype consists of the character 1 and 2. The length of each individual string is the same as the total number of cells in the location area $L_{21}$. In this example, each of chromosome strings has the length 5 that is equal to the total number of cells in the location layer $L_{21}$.

Initially, the page zone number, either 1 or 2 in this example, is randomly assigned to each cell represented in the chromosome string. For example, if a chromosome string '11221' is randomly assigned, then the chromosome string represents the assignment such that the cells 2, 4, and 9 are in the paging zone $P_1$ and the cells 6 and 7 are in the paging zone $P_2$. In this example, the total permutation of distinct individuals in the initial population is $2^5$.

b.) Computing the Values of the Paging Cost Function

At this stage, the paging cost function value for each chromosome string is computed. Assume that a chromosome string has the assignment '11221'.

The number of cells in the page zone $P_1$ is $N(P_1)=3$.
The number of cells in the page zone $P_2$ is $N(P_2)=2$.

| Cell No. | C2 | C4 | C6 | C7 | C9 |
|---|---|---|---|---|---|
| Probability | 0.17 | 0.35 | 0.24 | 0.21 | 0.03 |

The location probability of $P_1$ is $Probe(P_1)=0.17+0.35+0.03=0.55$.

The location probability of $P_2$ is $Probe(P_2)=0.24+0.21=0.45$.

In any partition, we always have $Prob(P_i)>Prob(P_j)$ for $1 \leq i \leq j \leq k$, so here it is also true for $Prob(P_1)>Prob(P_2)$. The paging cost for the chromosome string '11221' is given as the following:

$$C_p=N(P_1)+(1-Prob(P_1))*N(P_2)=3+(1-0.55)*2=3.9$$

Step 4) Creating New Generation

Suppose the tournament selection method is used in order to select individuals (parents) '11221' and '21122'. A genetic operator is applied to these parents to create their children. The probability of selection for each of the genetic operators is an input to the genetic optimization. Assume the crossover operator is used to create the children and the division point 3 is chosen randomly. After the crossover operation is applied, the children '11222' and '21121' are generated.

The inverse tournament selection method selects two replacement individuals, and they are replaced by the children '11222' and '21121'. The Step 4 is repeated 100 times to generate a new generation. When the new generation is populated, the best individual who has the smallest paging cost in the population is observed. The process of creating new generation is repeated till the paging cost of the best individual can not be farther reduced. At the end, the best individual '21122' is created.

Step 5) Generating Optimal Paging Zones

From the best individual '21122', paging zone $P_1=\{4, 6\}$ and $P_2=\{2, 7, 9\}$ are generated from the location layer $L_{21}$. The expected paging cost is $C_p=2+(1-0.59)*3=3.23$ for location layer $L_{21}$ Conclusion In summary, this invention does the following things in order to reduce both the paging cost and bandwidth consumption in both forward and reverse control channels and to improve the performance of the mobile systems:

1.) By using the well-designed histogram, the knowledge of mobile usage patterns is discovered with the quality resolution of mobile data distributions in the dimensions of both the time segments and the cells in geographical location areas. The mobile probability patterns are derived with careful consideration of the bias non-uniform property of mobile data distribution.

2.) With the help of the mobile probability patterns, we define the paging cost function in terms of probable paging cost. By applying the genetic optimization, we present the schema for the optimal partition of page zones such that the paging cost is minimized in terms of the defined paging cost function.

3.) The strategy presented is also dynamic and adaptive. The mobile usage data stored in the histogram can be constantly monitored and dynamically updated. The new mobile probability pattern can always be derived to reflect the most recent trends of the mobile usage pattern. As soon as the new probability pattern is derived, the corresponding new partition that obeys the new probability pattern can be easily generated by running the existing genetic optimization since the genetic optimization approach converges very fast in terms of the paging cost function. The paging schema can always be adaptively and dynamically adjusted.

The foregoing and other objects, advantages and features of the present invention have been described in connection with the drawings as they relate to the preferred embodiment of the present invention. Those of skill in the art will recognize that many changes can be made to the described methods without departing from the spirit and scope of this invention.

What is claimed is:

1. A method for optimizing paging of a mobile telecommunications device in a cellular telecommunications network comprising the steps of:

a) determining the probability that the mobile device is located physically within the geographic area served by each physical cell in the network during a given sampling period;

b) creating a first generation of paging zone plans consisting of at least two randomly created paging zone plans, each paging zone plan consisting of cells where the probability that the mobile unit is located therein is non-zero, and calculating the paging cost for each first generation paging zone plan;

c) performing a genetic operation on the two paging zone plans having the lowest paging cost in the first generation of paging zone plans to produce two resulting paging zone plans and substituting the resulting paging zone plans for the paging zone plans in the first generation of paging zone plans having the two highest paging costs;

d) repeating step c an arbitrary number of times until a further generation of paging zone plans has been produced; and, e) repeating steps c and d with the further generation of paging zone plans resulting from step d being substituted for the first generation of paging zone plans in step c until the lowest cost paging zone plan for one generation of paging zone plans is not greater than the lowest cost paging zone plan for the subsequent generation.

2. The method of claim 1 additionally including the step of paging the mobile device in the lowest cost paging zones defined in step e.

3. The method of claim 1 wherein the number of paging zones is in the range of between 2 and 4.

4. The method of claim 1 wherein the genetic operation comprises either a cross-over or a reproduction operation.

5. The method of claim 4 wherein a cross-over operation occurs about 70% of the time and a reproduction operation occurs about 30% of the time.

6. A method for optimizing paging of a mobile telecommunications device in a cellular telecommunications network comprising the steps of:

a.) determining the probability that the mobile device is located physically within the geographic area served by each physical cell in the network during a given sampling period;

b.) using the probability that the mobile device is located within each physical cell in the network in a genetic optimization process to define a plurality of paging zones for locating the mobile device among only those cells where the probability that the mobile device is located therein is non-zero, said genetic optimization process including the steps of:

creating a first generation including a plurality of randomly created paging zone plans, each paging zone plan of said first generation including a plurality of paging zones;

calculating the paging cost for each paging zone plan of said first generation;

performing a genetic operation on the two paging zone plans of said first generation having the lowest paging cost to produce two resulting paging zone plans; and, substituting said resulting paging zone plans for the two paging zone plans of said first generation having the highest paging cost.

7. The method of claim 6 wherein the genetic operation comprises either a cross-over or a reproduction operation.

8. The method of claim 6 wherein a cross-over operation occurs about 70% of the time and a reproduction operation occurs about 30% of the time.

9. The method of claim 6 includes repeating said performing and substituting steps of claim 6 for a plurality of times to change a first generation paging zone plans into the second generation paging zone plans.

* * * * *

UNITED STATES PATENT AND TRADEMARK OFFICE
CERTIFICATE OF CORRECTION

PATENT NO.    : 6,181,945 B1
DATED         : January 30, 2001
INVENTOR(S)   : Lee It is certified that error appears in the above-identified patent and that said Letters Patent is hereby corrected as shown below:

<u>Column 3,</u>
Line 16, please insert the number -- 5 -- after the word "sending."

Signed and Sealed this

Twenty-ninth Day of January, 2002

Attest:

Attesting Officer

JAMES E. ROGAN
Director of the United States Patent and Trademark Office